US008403557B2

(12) United States Patent
Li et al.

(10) Patent No.: US 8,403,557 B2
(45) Date of Patent: Mar. 26, 2013

(54) MICROMIXER USING INTEGRATED THREE-DIMENSIONAL POROUS STRUCTURE

(75) Inventors: Wei Li, Shoreline, WA (US); Hai Wang, Seattle, WA (US)

(73) Assignee: University of Washington, Seattle, WA (US)

( * ) Notice: Subject to any disclaimer, the term of this patent is extended or adjusted under 35 U.S.C. 154(b) by 1051 days.

(21) Appl. No.: 11/863,077

(22) Filed: Sep. 27, 2007

(65) Prior Publication Data

US 2008/0094937 A1 Apr. 24, 2008

Related U.S. Application Data

(60) Provisional application No. 60/848,306, filed on Sep. 28, 2006.

(51) Int. Cl.
 *B01F 5/00* (2006.01)
(52) U.S. Cl. .......................................... 366/340; 366/336
(58) Field of Classification Search .................. 366/336, 366/341, DIG. 1–4, 340
See application file for complete search history.

(56) References Cited

U.S. PATENT DOCUMENTS

| | | | | |
|---|---|---|---|---|
| 1,140,548 A | * | 5/1915 | Vogelsang | 366/163.2 |
| 3,449,477 A | * | 6/1969 | Logomasini | 264/45.6 |
| 3,799,742 A | * | 3/1974 | Coleman | 422/61 |
| 4,124,529 A | * | 11/1978 | Juntgen et al. | 502/432 |
| 4,329,067 A | * | 5/1982 | Goudy, Jr. | 366/152.1 |
| 4,426,451 A | * | 1/1984 | Columbus | 436/518 |
| 4,695,301 A | * | 9/1987 | Okajima et al. | 55/523 |
| 4,756,884 A | * | 7/1988 | Hillman et al. | 422/73 |
| 5,037,619 A | * | 8/1991 | Alagy et al. | 422/191 |
| 5,164,087 A | * | 11/1992 | Naoi et al. | 210/500.1 |
| 5,234,587 A | * | 8/1993 | Allington et al. | 210/198.2 |
| 5,505,892 A | * | 4/1996 | Domme | 264/29.6 |
| 6,036,927 A | * | 3/2000 | Chatterjee et al. | 422/211 |
| 6,168,948 B1 | * | 1/2001 | Anderson et al. | 435/287.2 |
| 6,270,641 B1 | * | 8/2001 | Griffiths et al. | 204/451 |
| 6,368,871 B1 | * | 4/2002 | Christel et al. | 436/180 |
| 6,383,422 B1 | * | 5/2002 | Hoffschmidt | 264/44 |
| 6,418,968 B1 | * | 7/2002 | Pezzuto et al. | 137/833 |
| 6,672,756 B1 | * | 1/2004 | Barland | 366/175.2 |
| 6,729,352 B2 | * | 5/2004 | O'Connor et al. | 137/827 |
| 6,880,576 B2 | * | 4/2005 | Karp et al. | 137/806 |
| 6,926,828 B2 | * | 8/2005 | Shiraishi et al. | 210/310 |
| 6,935,772 B2 | * | 8/2005 | Karp et al. | 366/341 |
| 6,981,522 B2 | * | 1/2006 | O'Connor et al. | 137/803 |
| 7,028,536 B2 | * | 4/2006 | Karp et al. | 73/61.52 |

(Continued)

FOREIGN PATENT DOCUMENTS

JP 58150421 A * 9/1983

OTHER PUBLICATIONS

Bertsch, A., et al., "Static Micromixers Based on Large-Scale Industrial Mixer Geometry," Lab on a Chip 1:56-60, 2001.

(Continued)

*Primary Examiner* — David Sorkin
(74) *Attorney, Agent, or Firm* — Christensen O'Connor Johnson Kindness PLLC

(57) ABSTRACT

A micromixer is fabricated using a selective high intensity focused ultrasound foaming technique. The micromixer employs a 3D porous region for effective mixing. The 3D porous micromixer can achieve sufficient mixing results with a short mixing length for flows with a Reynolds number as low as 0.1. The fabrication process of the micromixer is rapid, low-cost, and biocompatible. The pore size of the micromixer can be controlled by adjusting the selective high intensity focused ultrasound foaming parameters. The micromixer has potential for use in lab-on-a-chip and micro-total-analysis devices.

24 Claims, 9 Drawing Sheets

U.S. PATENT DOCUMENTS

| | | | | |
|---|---|---|---|---|
| 7,189,368 | B2* | 3/2007 | Andersson et al. | 422/100 |
| 7,318,912 | B2* | 1/2008 | Pezzuto et al. | 422/103 |
| 7,534,315 | B1* | 5/2009 | Singh et al. | 156/60 |
| 2003/0198130 | A1* | 10/2003 | Karp et al. | 366/341 |
| 2003/0213733 | A1* | 11/2003 | Beckham et al. | 210/136 |
| 2004/0149634 | A1* | 8/2004 | Hughes | 210/96.1 |
| 2004/0178143 | A1* | 9/2004 | Rogers et al. | 210/510.1 |
| 2004/0245172 | A1* | 12/2004 | Petersen | 210/510.1 |
| 2005/0087767 | A1* | 4/2005 | Fitzgerald et al. | 257/200 |
| 2005/0095602 | A1* | 5/2005 | West et al. | 435/6 |
| 2005/0133457 | A1 | 6/2005 | Tonkovich | |
| 2008/0102478 | A1* | 5/2008 | Li et al. | 435/7.23 |

OTHER PUBLICATIONS

Bessoth, F.G., et al., "Microstructure for Efficient Continuous Flow Mixing," Analytical Communications 36:213-215, 1999.

Cha, J., et al., "A Highly Efficient 3D Micromixer Using Soft PDMS Bonding," Journal of Micromechanics and Microengineering 16:1778-1782, 2006.

Chen, H., and J.-C. Meiners, "Topologic Mixing on a Microfluidic Chip," Applied Physics Letters 84(12):2193-2195, 2004.

Chor, M.V., and W. Li, "A Permeability Measurement System for Tissue Engineering Scaffolds," Measurement Science and Technology 18:208-216, 2007.

Hong, C.-C., et al., "A Novel In-Plane Passive Microfluidic Mixer With Modified Tesla Structures," Lab on a Chip 4:109-113, 2004.

Johnson, T.J., et al., "Rapid Microfluidic Mixing," Analytical Chemistry 74:45-51, 2002.

Kim, D.S., et al., "A Barrier Embedded Chaotic Micromixer," Journal of Micromechanics and Microengineering 14:798-805, 2004.

Lee, S., et al., "Ink Diffusion in Water," European Journal of Physics 25:331-336, 2004.

Lin, Y., et al., "Ultrafast Microfluidic Mixer and Freeze-Quenching Device," Analytical Chemistry 75:5381-5386, 2003.

Macinnes, J.M., et al., "Numerical Characterisation of Folding Flow Microchannel Mixers," Chemical Engineering Science 62:2718-2727, 2007.

Nguyen, N.-T., and Z. Wu, "Micromixers—A Review," Journal of Micromechanics and Microengineering 15:R1-R16, 2005.

Schönfeld, F., et al., "An Optimised Split-and-Recombine Micro-Mixer With Uniform 'Chaotic' Mixing," Lab on a Chip 4:65-69, 2004.

Vijayendran, R.A., et al., "Evaluation of a Three-Dimensional Micromixer in a Surface-Based Biosensor," Langmuir 19:1824-1828, 2003.

Wang, H., and W. Li, "Toward the Fabrication of Hierarchically-Structured Porous Polymers for Tissue Engineering Scaffolds," Proceedings of the ASME International Mechanical Engineering Congress and Exposition (IMECE 2005), Orlando, Florida, Nov. 5-11, 2005, pp. 1-8.

Braren, B., et al., "Focused Ultrasound for Microscopic Patterning of Polymers," Research Disclosure, Kenneth Mason Publications Ltd., England, Mar. 1, 1991 [published electronically Apr. 2, 2005], retrieved from IP.com PriorArtDatabase, IP.com No. IPCOM000120195D.

Wang, X, et al., "A Method for Solvent-Free Fabrication of Porous Polymer Using Solid-State Foaming and Ultrasound for Tissue Engineering Applications," Biomaterials 27(9):1924-1929, Mar. 2006.

\* cited by examiner

MICROMIXER USING INTEGRATED THREE-DIMENSIONAL POROUS STRUCTURE

CROSS-REFERENCE TO RELATED APPLICATIONS

This application claims the benefit of Provisional Application No. 60/848,306, filed Sep. 28, 2006, expressly incorporated herein by reference in its entirety.

STATEMENT OF GOVERNMENT LICENSE RIGHTS

This invention was made with Government support under Contract No. 0348767 awarded by the National Science Foundation. The Government has certain rights in the invention.

BACKGROUND

In microfluidic-related chemical and biological applications, mixing on the micro scale is important and has been considered one of the most challenging tasks. Specifically, rapid and efficient mixing of small quantities of reactants is useful in areas such as DNA hybridization, cell activation, and enzyme reaction. However, it is difficult to mix fluids in microfluidic systems due to the low Reynolds numbers involved, typically smaller than 10. Under such conditions, micromixing is mostly dominated by diffusion, which is time-consuming and inefficient.

Micromixers can be categorized into passive and active micromixers. Active micromixers use disturbance generated by external energy, such as pressure, electrohydrodynamics, dielectrophoretics, and acoustics, to improve the mixing efficiency. Passive micromixers, on the other hand, rely on molecular diffusion or chaotic advection in the mixing process. They do not require external energy except for the pressure to drive the flow. Among the passive micromixers, the ones based on the chaotic advection principle have drawn more attention because of their higher mixing efficiency than the diffusion type of devices. Since conventional fabrication methods cannot form precisely aligned microchannels where stacking up of 2D patterns, the realization of a complex three-dimensional micromixer has been difficult.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A micromixer is fabricated using a selective high intensity focused ultrasound foaming technique. The micromixer employs a 3D porous region for effective mixing. The 3D porous micromixer can achieve sufficient mixing results with a short mixing length for flows with a Reynolds number as low as 0.1. The fabrication process of the micromixer is rapid, low-cost, and biocompatible. The pore size of the micromixer can be controlled by adjusting the selective high intensity focused ultrasound foaming parameters. The micromixer has potential for use in lab-on-a-chip and micro-total-analysis devices.

In a first embodiment, a micromixer includes a polymeric chip having a porous region, a first microfluidic inlet channel to the porous region, a second microfluidic inlet channel to the porous region at about the same location of the porous region as the first inlet, and a microfluidic outlet channel from the porous region that is distal to the first and second inlets such that fluids from the first and second inlets are mixed in the porous region before exiting as a mixed fluid through the outlet channel.

In a second embodiment, a micromixer includes a polymeric substrate having a porous foam formed internally from the polymeric substrate material, wherein the porous foam defines a length with a proximal end and a distal end, a first microfluidic channel leading to the porous foam at or about the proximal end, a second microfluidic channel leading out from the porous foam at or about the distal end, such that one or more fluids entering the porous foam from the first microfluidic channel are mixed in the porous foam before exiting from the second microfluidic channel.

In either of the first or second embodiments, the micromixers can include singly or in combination any of the following features. The micromixers can have a porous region with pores having an average size diameter of 10 µm to 200 µm. The micromixers can have a porous region with pores having an average size diameter of 80 µm to 200 µm. The micromixers can have be made from a polymeric chip, wherein the polymeric chip is a thin material, the porous region is internally located in the thin material, and the first and second inlets and the outlet comprise channels leading to or into the porous region, wherein the outlet is positioned at a distal location in relation to the first and second inlets. The micromixers can have more than one outlet, wherein each outlet is distally located from the inlets at a different length along the porous region. The micromixers can have more than two inlets, wherein the outlets remain distal to every inlet. The micromixers can be a passive mixer, meaning that the mixing is mainly attributed to chaotic advection in the mixer.

In a third embodiment, a method for mixing a first and second fluid in a micromixer is provided. The method includes supplying a first and second fluid to the micromixer, mixing the first and second fluids within a porous region of the micromixer, and obtaining a mixed fluid from an outlet of the micromixer, wherein the Reynolds number of the fluid in the micromixer is 0.1 to 10.

In a fourth embodiment, a method for mixing a first and second fluid in a micromixer is provided. The method includes supplying a first and second fluid to the micromixer, mixing the first and second fluids within a porous region of the micromixer, and obtaining a mixed fluid from an outlet of the micromixer, wherein the porous region comprises pores having an average diameter size of 10 µm to 200 µm.

In either of the third or fourth embodiments, the following features may be combined with the third and fourth embodiments, either singly or in combination. The third and fourth embodiments may further be characterized by the porous region having pores having an average size diameter of 10 µm to 200 µm. The third and fourth embodiments may further be characterized by the porous region having pores having an average size diameter of 80 µm to 200 µm. The third and fourth embodiments may further be characterized by the one or both fluids comprising living cells. The third and fourth embodiments may further be characterized by the first fluid comprising first living cells and the second fluid comprising second living cells that are different from the first living cells.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
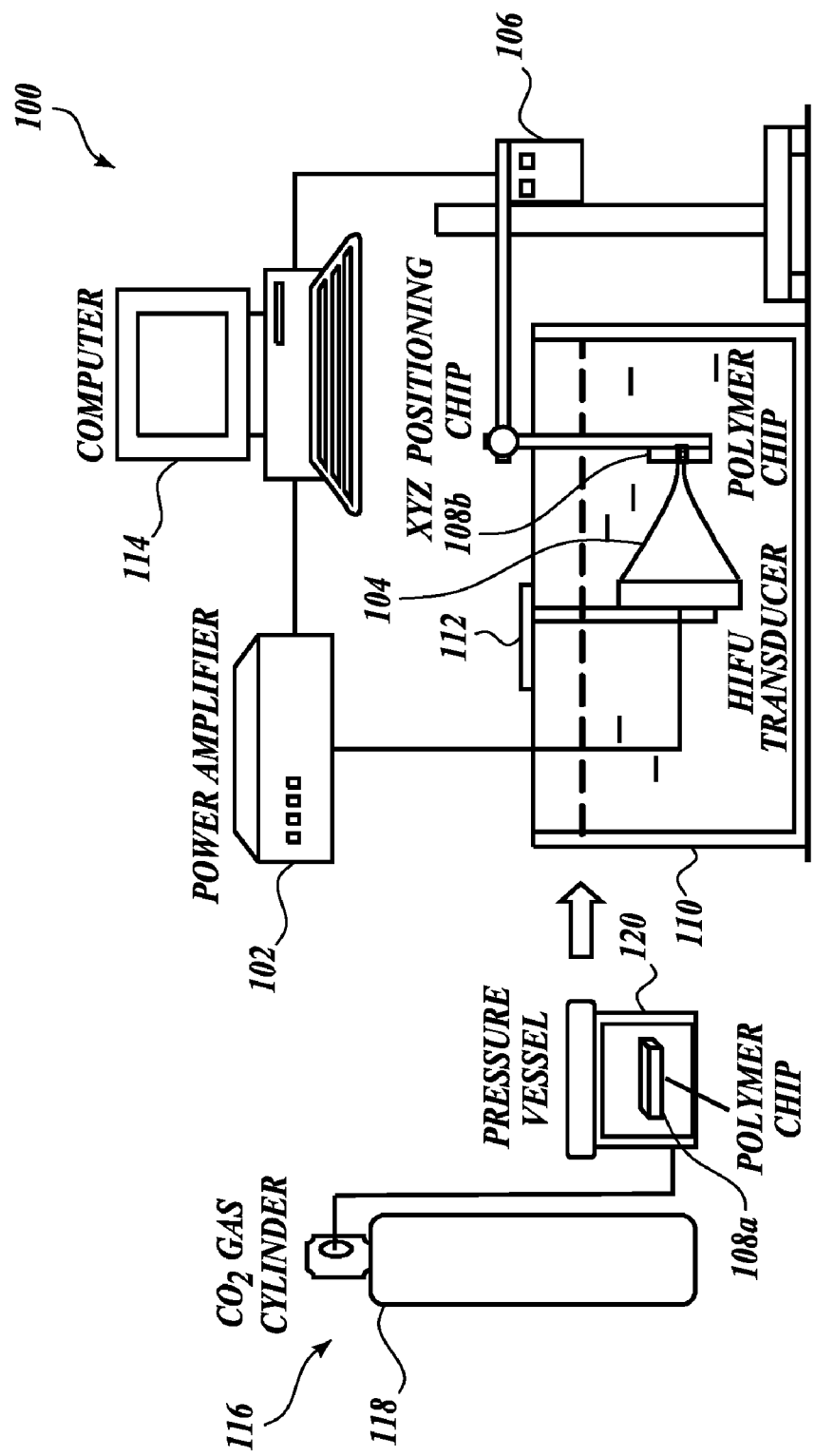
FIG. 1 is a diagrammatical illustration of a high intensity ultrasonic foaming system.
Figure 2:
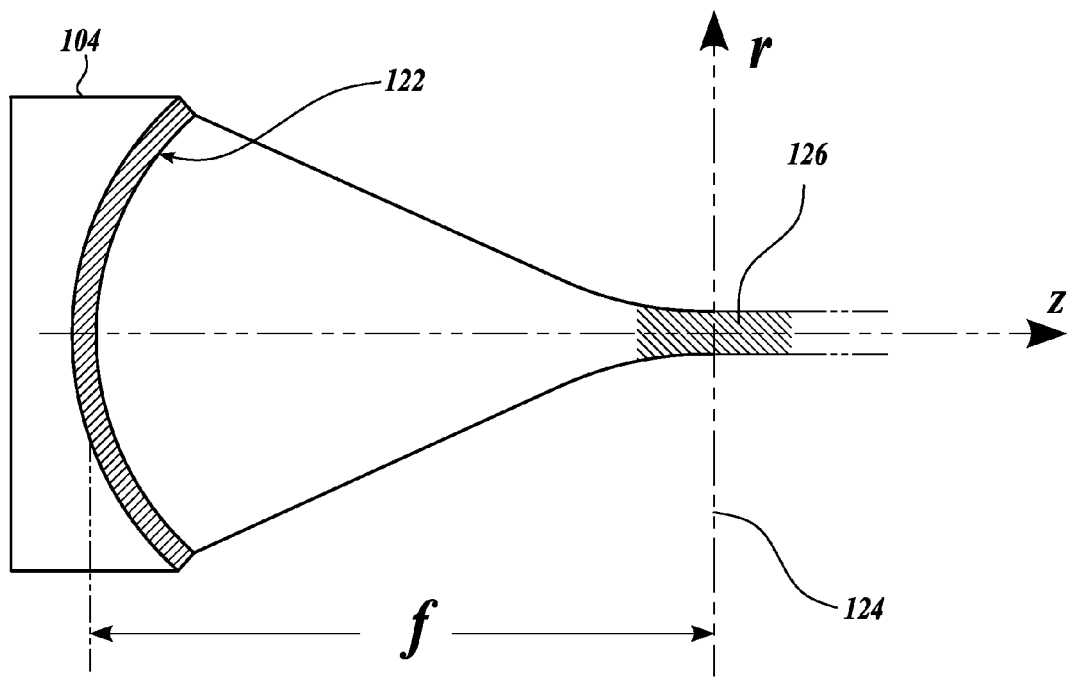
FIG. 2 is a schematic illustration of a high intensity focusing ultrasound device.

Illustrated in FIG. 1 is a high intensity focused ultrasound (HIFU) system 100 in accordance with one embodiment of the invention. The system 100 includes a high intensity focusing ultrasound transducer 104 connected to a power amplifier 102. Referring to FIG. 2, a schematic close-up illustration of the high intensity focusing ultrasound transducer 104 is illustrated. The high intensity focusing ultrasound transducer 104 includes a focusing substrate 122 having a concave surface that focuses ultrasound energy into a concentrated focal zone 126. The focal length of the high intensity focusing ultrasound transducer 104 is denoted by "f." The focal plane is denoted by "r." Preferably, when a polymeric chip is insonated with ultrasound energy, the polymeric chip is located anywhere in the focal zone 126. The high intensity focusing ultrasound transducer 104 produces high intensity ultrasound waves or energy that can be focused so that the focal plane can be targeted on a translation stage of a positioning system 106. The positioning system 106 includes means to move the translation stage in three directions. Those directions being the x and y direction in the focal plane and in the z direction forwards and rearwards of the focal plane. A gas impregnated polymeric chip 108b is placed at or on the translation stage at or near to the focal plane of the transducer 104. The polymeric chip 108b is in the target area of the high intensity focusing ultrasound transducer 104. As can be appreciated, the polymeric chip 108b can be moved in the x, y, and z directions so that any location on the polymeric chip 108b can be exposed to the ultrasound energy produced by the high intensity focusing ultrasound transducer 104. The high intensity focused ultrasound energy can be focused on the surface of the polymeric chip 108b or internally in the polymeric chip 108b and at any thickness within the chip. The high intensity focusing ultrasound transducer 104 and the polymeric chip 108b can be located in a tank 110 of distilled water for ulstrasound waves to propagate. The high intensity focusing ultrasound transducer 104 is stabilized by a support arm 112 connected to the high intensity focusing ultrasound transducer 104. The power amplifier 102 is connected to, and thereby, controlled by a computer 114. Computer 114 may be any one of a variety of devices including, but not limited to, personal computing devices, server-based computing devices, mini and mainframe computers, laptops, or other electronic devices having a type of memory. The computer 114 may include a processor, memory, computer-readable medium drive (e.g., disk drive, a hard drive, CD-ROM/DVD-ROM, etc.) that are all communicatively connected to each other by a communication bus. The computer 114 may also include a display and one or more user input devices, such as a mouse, keyboard, etc. Applications for running the system 100 may be stored in memory in the computer 114. Applications may be described in the context of computer-executable instructions, such as program modules being executed by the computer 114. Such applications may be used to control the amount of power from the power amplifier 102 passed to the high intensity focusing ultrasound transducer 104, and also to control the position of the polymeric chip 108b in relation to the focal plane or focal point of the high intensity focusing ultrasound transducer 104 by controlling the movement of the positioning system 106. To this end, the computer 114 is also connected to, and thereby communicates with, the positioning system 106. The computer 114 can issue commands to the positioning system 106 that permit the polymeric chip 108b to be moved in any direction in the xy plane and at any speed. Additionally, the computer 114 can issue commands to the positioning system 106 to move the polymeric chip 108b in the z direction so as to move the polymeric chip 108b to be within the focal plane or forward or rearward of the focal plane of the high intensity focusing ultrasound transducer 104.

A gas-saturation system 116 includes a gas cylinder 118 connected to a pressure vessel 120. The pressure vessel 120 receives gas and can include pressure regulating means to control the gas pressure within the interior of the pressure vessel 120. The pressure vessel 120 may also include timing means to keep track of the time at a given pressure. The pressure vessel 120 can be used to hold a polymeric chip 108a for a given time and at a given pressure. The gas-saturation system 116 is used to impregnate the polymeric chip 108a with the gas. In one embodiment, the pressure used to impregnate polymeric chip 108a may be in the range of 2 MPa to 10 MPa at room temperature. Additionally, the pressure vessel 120 may be opened to the atmosphere in order to allow gas to desorb from the polymeric chip 108a. Once the polymeric chip 108a has been impregnated with gas from gas cylinder 118, the polymeric chip 108a may be fully saturated with gas or partially saturated with gas. The polymeric chip 108a may additionally undergo desorption of gas for a given period of time at atmospheric pressure. This allows for a quicker method of achieving a desired gas concentration for partial saturation of the polymeric chip 108a. For example, the polymeric chip 108a may be impregnated with gas to full saturation at a high pressure. Thereafter, the pressure vessel 120 may be opened to atmosphere to allow the polymeric chip 108a to desorb gas to bring the saturation level to less than full saturation. This achieves a quicker low gas concentration level in the polymeric chip 108a as compared to initially impregnating the polymeric chip 108a with gas at a lower pressure. From the pressure vessel 120, the polymeric chip 108a is transferred to the arm of the positioning system 106 and may be insonated with high intensity focused ultrasound energy to create a localized porous foam within the polymeric chip 108b. One or more areas of the polymeric chip 108b may be insonated with high intensity focused ultrasound energy to create one or more localized and separated areas of foam, or porous regions. The porous regions are formed from and are the same material as the polymeric chip 108b and can be interior to or on the surface of the polymeric chip 108b. Furthermore, one or more porous regions can be arranged on the chip in any configuration desirable by controlling the positioning system 106. This allows the creation of porous regions that can be separated and distinct from each other within the same polymeric chip 108b. This is possible because of the polymeric chip 108b being mounted to the translation stage of the positioning system 106, and further, the computer 114 can control the start and stop of insonation of high intensity ultrasound energy to permit selective foaming in any desired location on the polymeric chip 108b. It is further possible to control one or more variables that influence the pore size diameter of the pores in the porous regions of foam and also to control whether the pores are interconnected open-celled pores or close-celled pores. These variables include but are not limited to controlling the gas pressure in the pressure vessel 120, controlling the time that the polymeric chip 108a is exposed to gas under pressure, controlling the time that the polymeric chip 108a is allowed to desorb gas after gas impregnation, controlling the power of the high intensity focused ultrasound transducer 104, controlling the speed that the polymeric chip 108b is moved with respect to the focused beam of ultrasound energy, and controlling the distance of the polymeric chip 108b with respect to the focal plane or focal point. For producing interconnected open-celled pores, the method includes providing a polymeric chip having a gas concentration of 3-5% by weight. This concentration may be obtained by removing the polymeric chip 108a from the pressure vessel 120 before equilibrium is reached. Alternatively, the polymeric chip 108a may be fully saturated, and then allowed to desorb gas to achieve the desired partial saturation and gas concentration.

A method of making a foam having micro cellular pores in accordance with one embodiment of the invention includes impregnating a polymeric chip 108a with gas, followed by applying high intensity focused ultrasound energy onto the gas-impregnated chip. In the gas impregnation step, the polymeric chip 108a is placed into the high-pressure vessel 120 filled with an inert gas, such as nitrogen or carbon dioxide. Over time, the gas molecules dissolve into the polymeric chip 108a so that the chip 108a becomes gas-impregnated. Depending on the gas pressure and the impregnation time (the time that the chip 108a remains in the pressure vessel 120), the final gas concentration in the impregnated polymeric chip 108a can be controlled. In a subsequent step, the gas-impregnated polymeric chip 108a is retrieved from the pressure vessel and mounted on a computer controlled XYZ stage for ultrasonic insonation with the high intensity focusing ultrasound transducer 104. Because of the heating and implosion effects induced by ultrasound waves or energy, the gas-impregnated polymeric chip 108b becomes thermodynamically unstable and undergoes phase separation to generate a foam microstructure having microcellular pores.

The high intensity focused ultrasound polymer foaming effect happens based on two ultrasound related processes: high intensity focused ultrasound heating and high intensity focused ultrasound cavitation. When the polymeric chip is under ultrasound insonation, part of the acoustic energy will be deposited into (or absorbed by) the polymer matrix during the sound wave propagation. The amount of the acoustic energy dissipation depends on the properties of material and the sound wave such as the attenuation coefficient and the ultrasound frequency, and in turn causes the ultrasound heating effect. Besides the heating effect, high intensity focused ultrasound has a cavitation effect in a viscous fluid. High intensity focused ultrasound cavitation happens during the negative cycle of sound pressure, under the conditions that a) the local acoustic pressure is beyond a certain pressure threshold, and b), the existence of tiny cavities in the medium which serve as cavitation nuclei.

Figure 3:
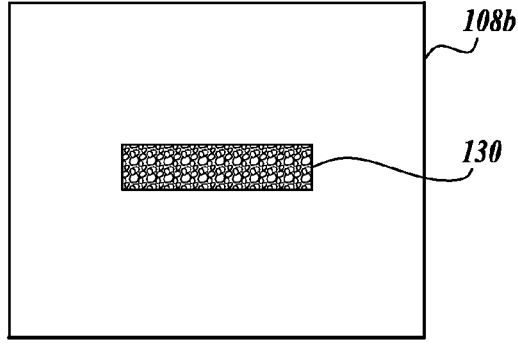
FIG. 3 is a diagrammatical illustration of a polymeric chip having a foam formed from the material of the polymeric chip.

Referring to FIG. 3, a diagrammatical illustration of a polymeric chip 108b with a single localized region of a microcellular porous foam 130 is illustrated. However, the polymeric chip 108b can have any number of porous foam region such as 130. Using the selective foaming method described herein, the localized region of microcellular porous foam 130 can be created in or on any location of the polymeric chip 108b. Regions as small as 1 mm on a side may be produced using the selective high intensity focused ultrasound method described. Furthermore, the polymeric chip 108b and the microcellular porous foam 130 is the same monolithic material so that the foam 130 is formed from the polymeric chip 108b. The foam 130 includes pores having an average diameter of 10 μm to 200 μm, or an average diameter of 80 μm to 200 μm. The average diameter of the pores, D, is calculated as $$D = \frac{\sum_{i=1}^{N} \sqrt{4 \times A_i / \pi}}{N}$$

where $A_i$ is the area of $i^{th}$ pore and N is the total number of the pores measured on a scanning electron microscopy (SEM) image of a cross section of a porous region. The polymeric chip 108b is a thermoplastic polymer such as, but not limited to poly(lactic acid), poly(lactic-co-glycolic acid), poly(methyl methacrylate), or polystyrene. These polymers are either biocompatible or biodegradable materials and are useful for many medical or biological applications.

A micromixer in accordance with one embodiment of the present invention may be fabricated using the high intensity focused ultrasound system 100 and method described above.

Figure 4:
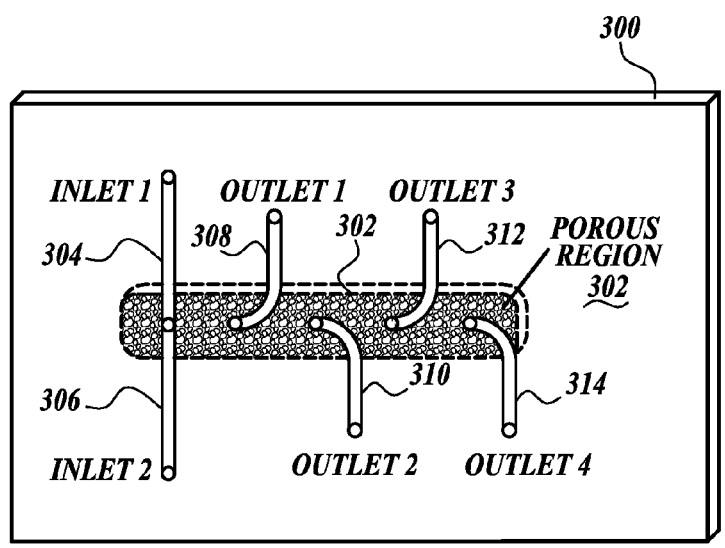
FIG. 4 is a diagrammatical illustration of one embodiment of a micromixer

Referring to FIG. 4, a polymeric chip 300 having a micromixer 302 disposed in the polymeric chip 300 is illustrated. The polymeric chip 300 includes a porous region 302. The porous region extends generally lengthwise. The porous region 302 comprises microcellular open-celled pores. Microcellular open-celled pores are generally produced by partially saturating the polymeric chip 300 with gas. The pores have an average diameter in the range of 10 μm 200 μm. Another suitable range of pore average diameter includes the range of from 80 μm to 200 μm. Using the high intensity focused ultrasound system and method described above, the porous region 302 can be located in any area within the polymeric chip 300. Furthermore, more than one porous region 302 can be included in the same polymeric chip 300. The porous region 302 has a proximal end and a distal end. For purposes of illustration only, the proximal end may be considered to be the left side of the illustration and the distal end to be the right side of the illustration. For the polymeric chip 300 having the porous region 302 to be made into a micromixer, at least one inlet is provided at the proximal end. When one inlet is used, to mix two or more fluids, the fluids may have to be combined in the single inlet. Alternatively, any number of inlets may be used. For example, in FIG. 4, a first 304 and a second 302 inlet are provided. The first inlet 304 enters the porous region 302 at the proximal end of the porous region 302. A second inlet 306 enters the porous region 302 at or about the same location as the first inlet 304 at the proximal end. It is noteworthy that fluids to be mixed are preferably introduced at a localized area, as opposed to a major surface so that as much of the length and volume of the micromixer may be utilized for mixing as is practical. A method for mixing, may, for example, include introducing a first and a second fluid to the first inlet 304 and the second inlet 306, or as a combined fluid to one inlet when the micromixer utilizes a single inlet. As fluids continue to be introduced into the inlets 304 and 306, the fluids are transferred generally towards the proximal end of the porous region. As the fluids traverse the porous region for any length, the two fluids experience mixing with one another. Generally, this mixing is passive mixing, including molecular diffusion and/or chaotic advection in the mixing process. However, generally the micromixer may rely more on chaotic advection in the mixing process. One or more outlets may be provided at any location that is distal to the one or more inlets. For example, in FIG. 4, four outlets have been illustrated. However, other embodiments of the micromixer may include as few as one inlet, or may include more than four inlets. The inlets and outlets are microfluidic channels that are created using a micromilling tool to give the microfluidic channels a dimension of several tens to several hundreds of micrometers.

Using the high intensity focus ultrasound system 100 and method described above, the porous region 302 can be created internally within the polymeric chip's 300 thin material. The one or more outlets are each located distally from the first and the second inlets at a different length along the porous region 302. If one or more inlets are provided and one or more outlets are provided, it is preferable that every outlet is distal to every inlet.

Embodiments of the micromixer described above are suitable for use in a method of mixing a first and a second fluid. The method includes supplying a first and a second fluid to the micromixer. The method includes mixing the first and second fluids within the porous region 302 of the micromixer. An advantage of the embodiments of the micromixer described herein is the ability to mix one or more fluids wherein the Reynolds number of the fluid being mixed in the micromixer is 0.1 to 10. In the method described above, the porous region 302 includes pores having an average diameter size of 10 μm to 200 μm, or in another embodiment, the porous region 302 includes pores having an average diameter size of 80 μm to 200 μm. The ability of the micromixer described herein lends itself advantageously suitable for mixing fluids in biomedical applications. For example, two fluids, each including living cells that are the same or different to each other can be mixed using the embodiments of the micromixer described herein. In one embodiment, the size of the microchannel inlets and outlets can have a width of about 600 μm and a depth of anywhere from 10 to 200 μm, 125 μm being about average.

EXAMPLE

Figure 5A:
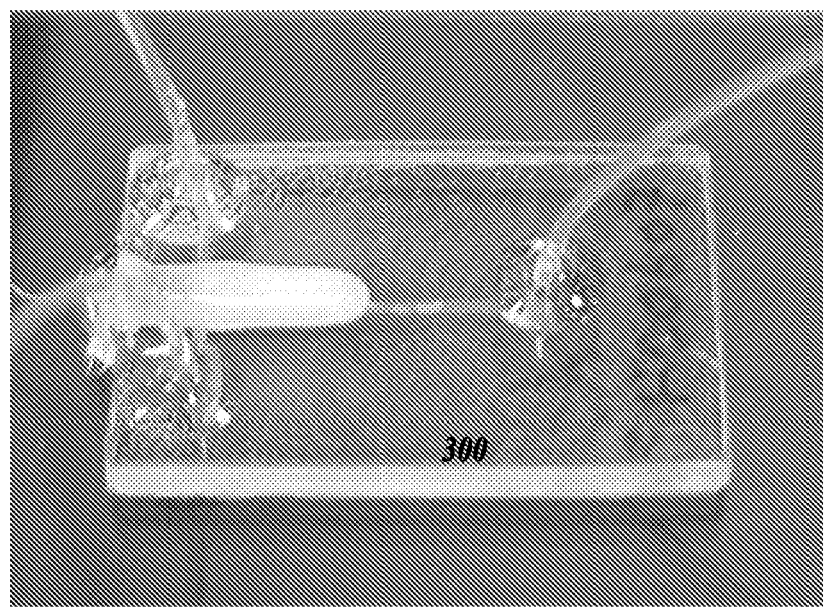
FIG. 5A is an image of a representative porous mixer.
Figure 5B:
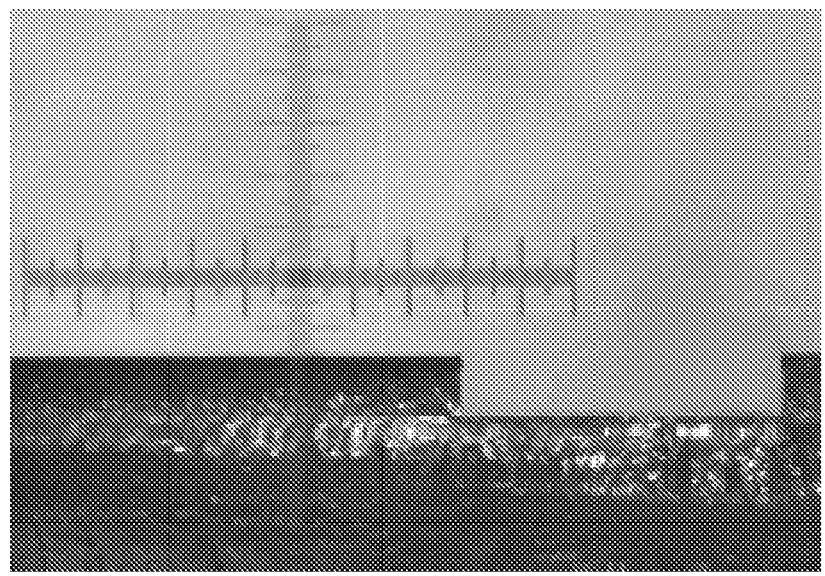
FIG. 5B is a cross-sectional image of the porous mixer of FIG. 5A.

FIG. 5A shows a porous micromixer fabricated using the high intensity focused ultrasound (HIFU) system 100 for this example. The white region on the left of the polymeric chip is the porous mixing region. The cross-section of the porous mixing region was measured at 1.7 mm wide and 1 mm deep. FIG. 5B is a cross-sectional image of the porous mixer of FIG. 5A showing a microchannel. The microchannel was 575 μm wide and 125 μm deep. The microstructure characterization of the porous region was performed using a scanning electronic microscope (Model Sirion XL 30 EDAX EDS, FEI Company, Hillsboro, Oreg.). The specimens were freeze-fractured in liquid nitrogen and subsequently sputter coated with Au/Pd. The material used to fabricate the 3D porous micromixer was poly(methyl methacrylate) (PMMA) (Professional Plastics, Inc., Los Angeles, Calif.). PMMA sheets were cut into 60×40 mm rectangular samples. The thickness of the samples was 2.5 mm. The saturation gas was carbon dioxide at 2 MPa of pressure. The HIFU transducer had a primary frequency of 1.1 MHz and a maximum acoustic power of 200 Watts (Model H101, Sonic Concepts, Inc., Bothell, Wash.). The focal length of the transducer was 64 mm. The size of the focal zone, defined by the lateral and axial FWHM (full width of half-max intensity), was $\phi 1.26$ mm×9.8 mm. The transducer was powered by a linear amplifier (Model AG1021, T&C Power Conversion, Inc., Rochester, N.Y.). After foaming, micro milling and drilling were used to machine channels and holes that connect the porous mixing region to the inlets and outlet of the micromixer. The micromachining was performed with a high-speed steel end mill cutter. The diameter of the cutter was 125 μm. A clear acrylic cover sheet was bound to one side of the micromixer with a double-sided adhesive acrylic tape (Arclad 8102, Adhesives Research, Inc., PA). Small diameter tubes were then used to connect to the inlets, as well as the outlet of the micromixer.

Flow visualization experiments were conducted to examine the performance of the porous micromixer. Before the experiment, the porous micromixer was desiccated overnight to remove any unexpected fluids. Two flows of red and blue colored dyes (diffusivity estimated as $3 \times 10^{-10}$ m²/s) were injected into the micromixer using a syringe pump (Model KDS200, KD Scientific Inc., Massachusetts). The flow condition was maintained for at least 4 minutes before any images were taken. This could eliminate potential error due to the transient effects of the incoming flows.

The operation conditions of the micromixer can be determined by a dimensionless Reynolds number, Re, defined as $$Re = \frac{UD_h}{v} \quad (1)$$

where $D_h$ is the hydraulic diameter, v is the kinematic viscosity, and U is the average velocity of the fluid. In this study the average velocity of the fluid was adjusted with the syringe pump. The kinematic viscosity was taken as that of water, 1.0 mm²/s. Because of the porous microstructure of the micromixer, an equivalent hydraulic diameter, $D_h^*$, was adopted based on the size of the inlet and outlet channels, $$D_h^* = \frac{2}{1/h + 1/w} D_h^* = \frac{2}{1/h + 1/w} \quad (2)$$

where h and w are the channel depth and width, respectively.

The variables for the flow visualization experiments were Reynolds number (corresponding to flow rate), mixing length, and pore size of the porous micromixer. Table 1 lists the values of these variables. Four different flow rates were selected as U=0.0021, 0.021, 0.08, and 0.2 ml/min, corresponding to Reynolds numbers Re=0.1, 1.0, 3.8, and 9.5, respectively. The mixing lengths chosen were 2, 4, 6, and 8 mm. Two micromixers were used, one with 80 μm and the other with 200 μm average pore diameter.

Different mixing lengths of the micromixer were achieved with a special outlet channel design, as shown in FIG. 4. Instead of only one outlet, four outlets with 2 mm spacing were machined along the downstream of the porous micromixer. For each outlet, a quarter-circle transition channel was made to provide a smooth change in the flow direction. When conducting the mixing experiments, only one outlet was enabled at a time and the others were plugged. The microscope was placed right above the unplugged outlet while images were taken for mixing performance evaluation.

It should be pointed out that this special outlet arrangement could affect the accuracy of the mixing performance measurements, due to its effects on the transient time that the flows need to take to reach steady-state conditions. However, significant difference has not been observed among images taken at various time instances. It was concluded that the longer the mixing channel, the better the mixing results. It is possible that the difference caused by the transient time is less significant compared to that caused by other parameters under study, such as the pore size and mixing length.

TABLE 1

Parameters Used in the Flow Visualization Experiments.

| Variables | Values |
| --- | --- |
| Reynolds number Re | 0.1, 1.0, 3.8, 9.5 |
| (Corresponding flow rate in ml/min) | (0.0021, 0.021, 0.08, 0.2) |
| Mixing length (mm) | 2, 4, 6, 8 |
| Average diameter of the pores (μm) | 80, 200 |

One advantage of the selective ultrasonic foaming technique is that the pore size of the 3D porous microstructure can be controlled by setting appropriate fabrication parameters. By varying the ultrasound power and scanning speed, micromixers with two pore size levels of 80 and 200 μm were fabricated. The mixing length was again varied from 2 to 8 mm. To investigate the pore size effect, the experiments were conducted with a fixed flow rate of 0.08 ml/min, which corresponds to Re=3.8.

The micromixer with 80 μm was also tested with a low Reynolds number. In this case, the flow rate was set at 0.0021 ml/min, corresponding to a Reynolds number of Re=0.1.

Both visual and quantitative measures were used to evaluate the mixing performance. When the blue and red dyes are completely mixed, the color of the outlet flow turns purple. The color of the outlet flow was examined using a stereoscopic microscope with a CCD camera. The images taken during the flow visualization experiments were used to determine the mixing efficiency based on the uniformity of the purple color in the outlet flow.

In order to compare the mixing results quantitatively, a numerical mixing index was defined and calculated. It is known that the color of each pixel in a digital image is determined by its gray levels of red, green and blue color, known as the RGB values. For example, the RGB values of a pure red pixel are [255, 0, 0] in the 8-bit format as in our case and [65535, 0, 0] in the 16-bit format. Therefore, the mixing result of a particular experiment can be quantified by comparing the RGB values of an object image to those of a reference image that represents the best mixing result. Mathematically, the mixing index of each pixel can be calculated as $$\varepsilon = 1 - \sqrt{\frac{(R_{ob} - R_{ref})^2 + (G_{ob} - G_{ref})^2 + (B_{ob} - B_{ref})^2}{(R_p - R_{ref})^2 + (G_p - G_{ref})^2 + (B_p - B_{ref})^2}} \quad (3)$$

where $R_{ob}$, $G_{ob}$, and $B_{ob}$ are the gray level values of the red, green and blue colors of a pixel in an object image; $R_{ref}$, $G_{ref}$, and $B_{ref}$ are those of the corresponding pixel in the reference image; and $R_p$, $G_p$, and $B_p$ are those of a pure red or blue dye image. By definition, the mixing index $\varepsilon$ is equivalent to the Euclidean distance between the two corresponding pixels in the object and reference images normalized by the distance between pure colored dye, either red or blue, and the reference. Ideally, perfect mixing will give a mixing index equal to 1, which indicates that the RGB values of the corresponding pixels are identical in the object and reference images. The worst case is that the color of the pixel remains pure red (or blue), which will yield a mixing index of 0.

The dye solution used for the reference image was obtained by fully mixing the red and blue colored dyes in a beaker. The reference image was then taken by passing the premixed reference solution through a T-mixer whose channel size is identical to that of the 3D porous micromixer. The images for pure red and blue dyes were obtained using the same method.

Before Eq. (3) was used to calculate the mixing indices, all the images were preprocessed to match each other geometrically and to remove the distortions due to lighting differences. The matching was done through scaling the images based on the edges of the micro channel in each image. The lighting distortion was removed through subtracting the background RGB values from all the pixels within the fluidic channel.

To compare the results under different mixing conditions, the average RGB values along the flow direction were taken for the mixing index calculation. This was done because the mixing result variation along the flow direction was negligibly small in comparison to that across the channel width direction. Averaging along the flow direction could help remove possible high frequency noise in the images and provide a mixing index curve indicating the mixing uniformity across the channel width direction.

Figure 6A:
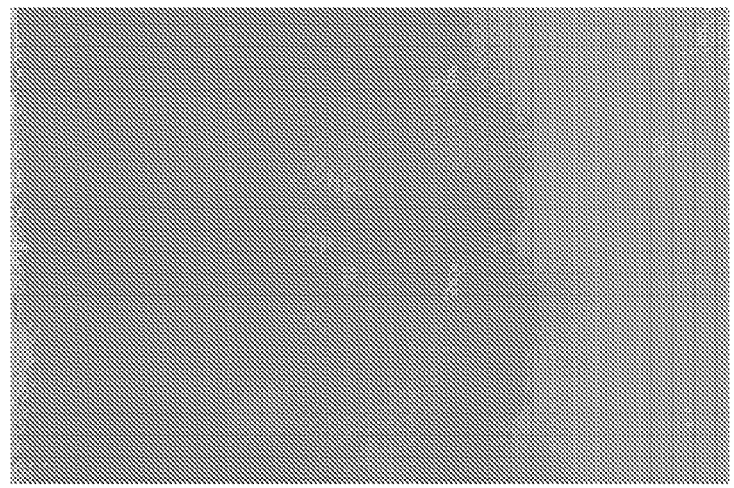
FIG. 6A is a representative visualization image for determining mixing index.
Figure 6B:
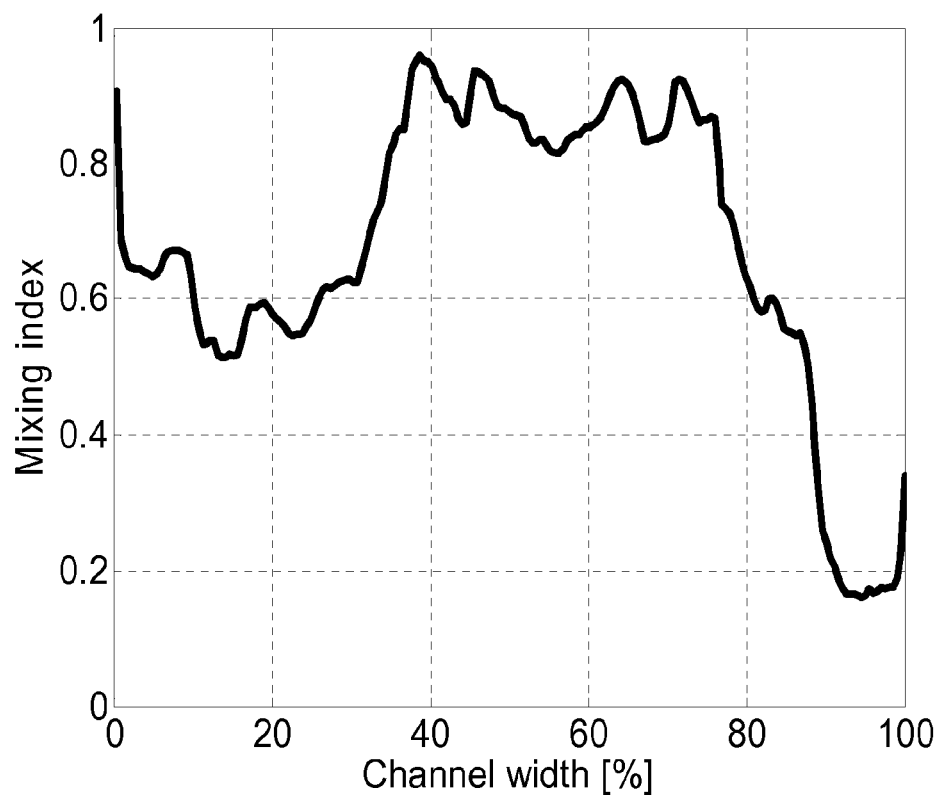
FIG. 6B is a representative graph of a mixing index curve for the image of FIG. 6A.

As an example, FIG. 6 shows a flow visualization image and its corresponding mixing index curve. The mixing index curve is a collection of points plotted on a graph having percent channel width as the abscisa (X axis) and the mixing index as the ordinate (Y axis). It can be seen from FIG. 6A that flows are still largely separate, showing a lack of sufficient mixing. This observation is verified by the mixing index curve shown in FIG. 6B. The x-axis of the plot indicates the position across the mixing channel and the y-axis the mixing index value.

Mixing Performance of the Porous Micromixer

Figure 7A:
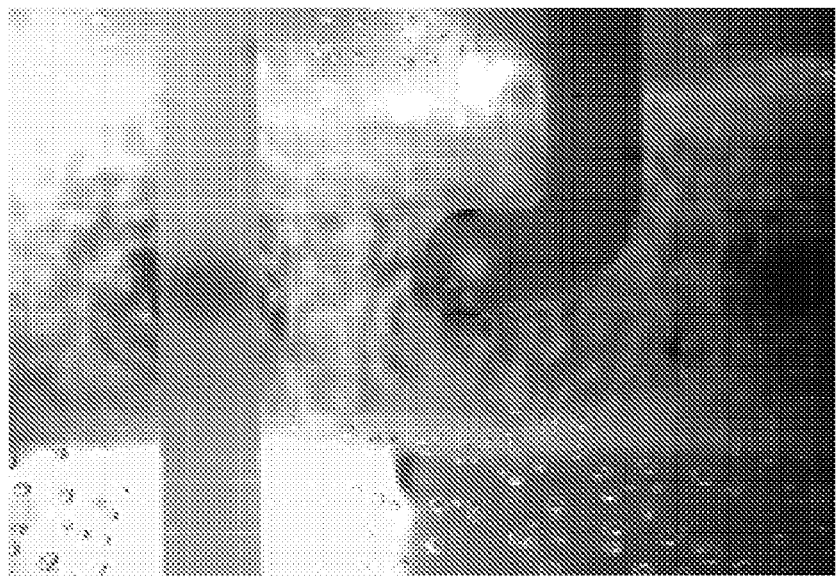
FIG. 7A is an image of a micromixer in accordance with one embodiment of the present invention.
Figure 7B:
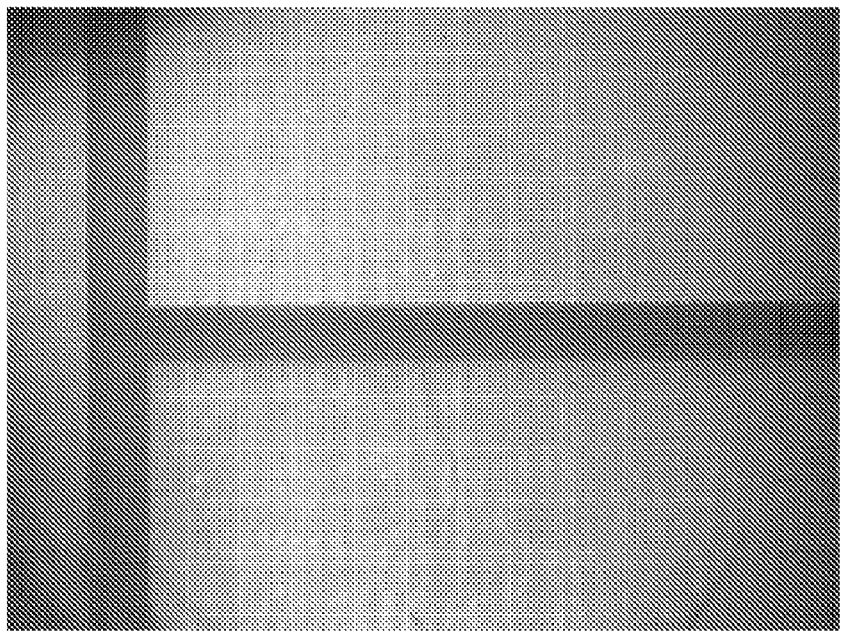
FIG. 7B is an image of a T-mixer.

The mixing performance of the porous micromixer was compared to that of a regular T-mixer under the same flow conditions. FIG. 7 shows images of a porous micromixer and the T-mixer. The geometry of the two mixers was similar, except that there was a foamed region in the porous micromixer of FIG. 7A. The Reynolds numbers for both mixers were Re=1.0. For the porous micromixer shown in FIG. 7A, a uniform purple colored flow was obtained immediately after the porous region, which was 2 mm downstream from where the two incoming flows met. FIG. 7B shows the result from the T-mixer. It was observed that the two flows remained completely separate throughout the entire mixing channel, which was 30 mm long.

Effects of Reynolds Number and Mixing Length

Figure 8A:
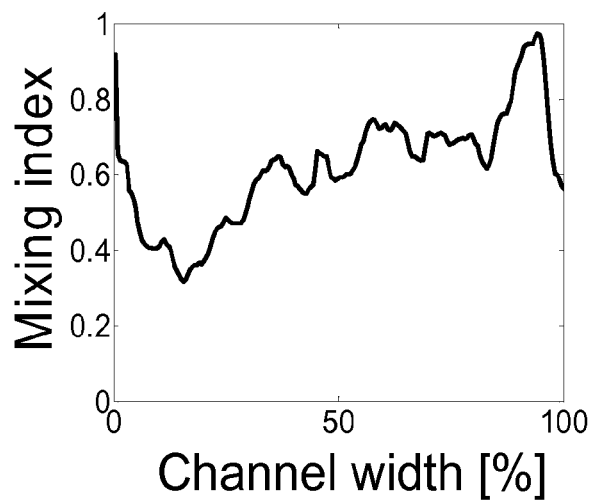
FIG. 8A is a graph of a mixing index curve for Re=1.0 and 6 mm mixing length.
Figure 8B:
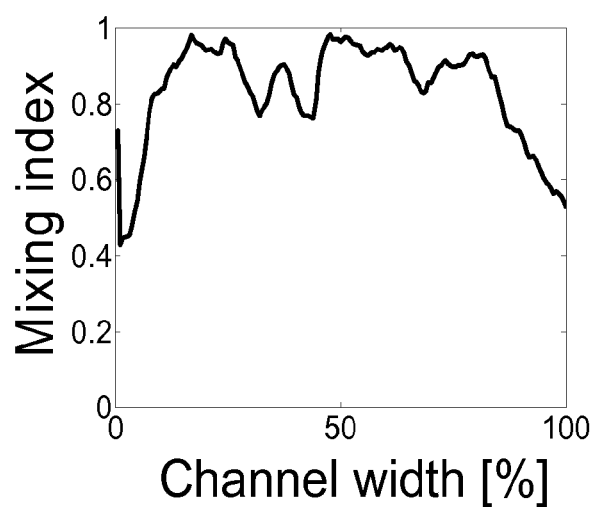
FIG. 8B is a graph of a mixing index curve for Re=3.8 and 6 mm mixing length.
Figure 8C:
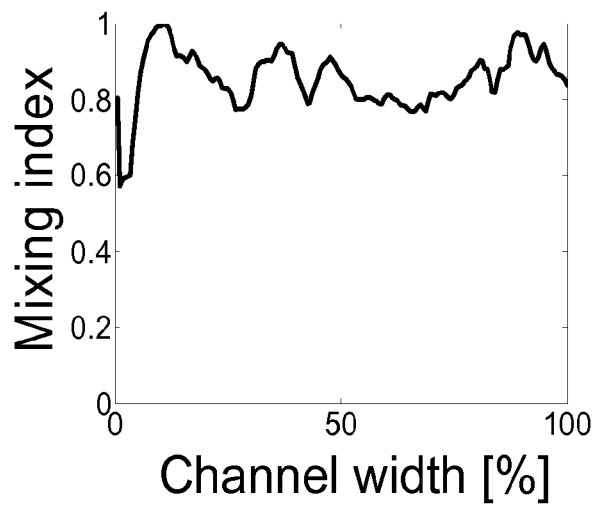
FIG. 8C is a graph of a mixing index curve for Re=9.5 and 6 mm mixing length.

Flow visualization trails with different Reynolds numbers and mixing lengths were conducted. The flow rates were 0.021, 0.08 and 0.2 ml/min, corresponding to Reynolds numbers Re=1.0, 3.8, and 9.5, respectively. The pore size of the micromixer was 200 μm in diameter. Images were taken at each of the four outlets of the micromixer corresponding to 2, 4, 6, and 8 mm mixing length. The results of the trials were plotted as a percentage of the channel width versus the mixing index from 0.0 to 1.0. Representative plots are provided in FIG. 8.

In general, the longer the mixing length is, the better the mixing results will be for any given Reynolds number (flow rate). For a given mixing length, the mixing result becomes better as the Reynolds number increases. This can be seen by comparing FIG. 8, where the mixing index curve for the 6 mm mixing length shows that the flows mixed well when Re=9.5 (FIG. 8C) (flow rate 0.2 ml/min), while they mixed less sufficiently when Re=1.0 (FIG. 8A) (flow rate 0.021 ml/min) and Re=3.8 (FIG. 8B) (flow rate 0.08 ml/min).

In order to compare various mixing results numerically, a root mean square (RMS) mixing index is defined based on the mixing index curve across the entire width of a mixing channel. The RMS mixing index, $\epsilon_{rms}$, is defined as $$\epsilon_{RMS} = \sqrt{\frac{\sum_{i=1}^{N} \epsilon_i^2}{N}} \quad (4)$$

where $\epsilon_i$ is the mixing index for the $i^{th}$ pixel, and N is the number of pixels across the channel width. The closer the $\epsilon_{rms}$ value is to 1, the better the mixing result should be. The standard deviation of $\epsilon_i$'s across the channel width can also be calculated to show the uniformity of the mixing result within individual channels. The mixing results were numerically compared against each other using the RMS mixing index and the standard deviation, as shown in FIG. 9.

Figure 9A:
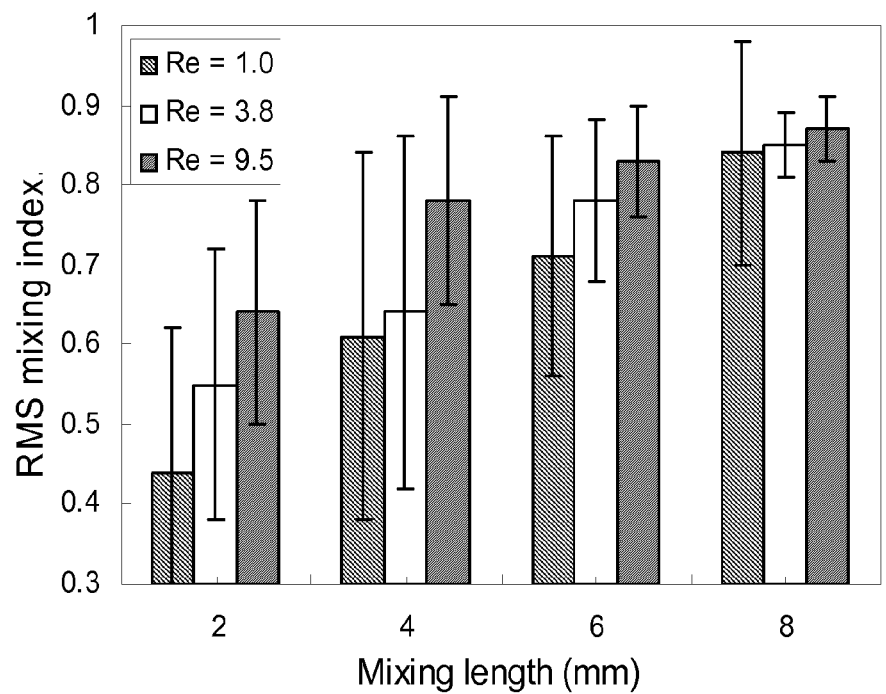
FIG. 9A is a bar graph plotting mixing length in millimeters and RMS mixing index for Reynolds numbers 1.0, 3.8, and 9.5.

It can be seen in FIG. 9A that the RMS mixing index increases as the mixing length increases. The error bars in the chart indicate one standard deviation of the mixing index. The error bar becomes smaller as the mixing length increases, which suggests that the mixing uniformity becomes better with a longer mixing length. The enhancement of uniformity also appears when the Reynolds number increases.

The above observations are consistent with the existing knowledge on macro-scale mixing. The idea of macro-scale mixing is to split, stretch, fold, and break the mixing flows by introducing special geometry in the mixing channels. The 3D porous structure in the micromixer in this example generates micro-scale effects similar to those on the macro scale. A large extent of splitting, stretching, folding, and breaking actions is generated through the complex 3D porous microstructure. By increasing the travel distance of the flow in the mixing region, a longer residence time is achieved such that more diffusion will occur between the two flows. Larger Reynolds numbers correspond to higher flow rates, which help increase the chance of turbulence formation and further improve the mixing results.

Effect of Pore Size on Mixing Performance

Flow visualization trails with two mixers, one having an average pore diameter of 200 μm and the other having an average pore diameter of 80 μm, were conducted. The 200 μm mixer used was a different one from that used for testing Reynolds numbers and mixing lengths. The Reynolds number of the flow was fixed at Re=3.8. A constant flow rate of 0.08 ml/min was used. For the case of 200 μm pores, the mixing performance improved with the mixing length, as has been seen before. However, a well mixed flow was not achieved until the mixing length was 8 mm. In the case of 80 μm pores, a well mixed flow was obtained at the very first outlet corresponding to the 2 mm mixing length. This result suggests that the smaller the pore size is, the more effective the porous micromixer will be.

Figure 9B:
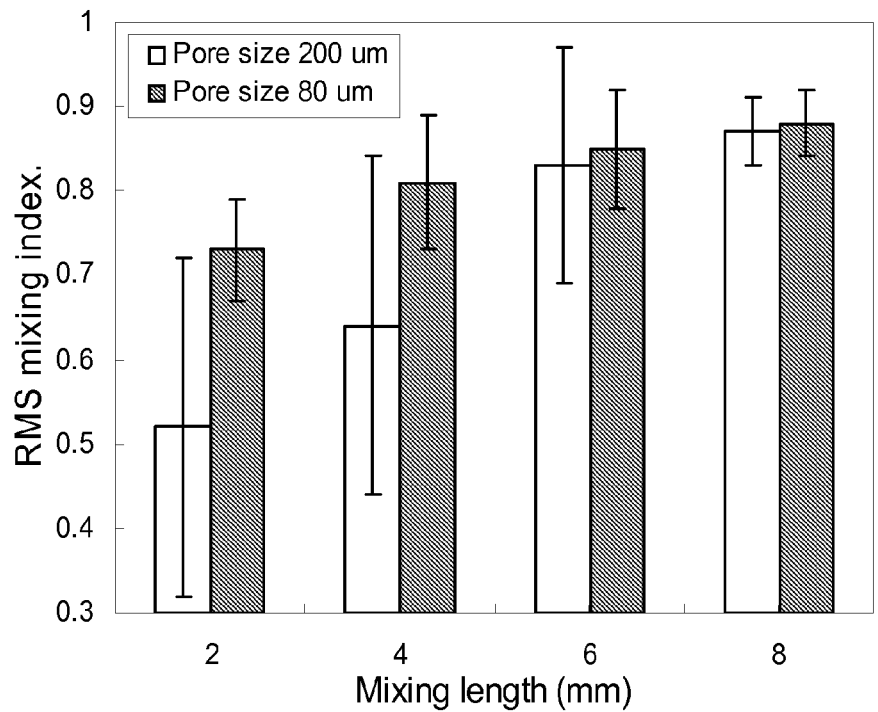
FIG. 9B is a bar graph plotting mixing length in millimeters and RMS mixing index for pore diameter sizes of 80 μm and 200 μm.

The effects of pore size can also be seen in FIG. 9B, where the RMS mixing index is plotted against the pore size and mixing length. Under both the 80 μm and 200 μm conditions, the RMS mixing index consistently increases as the mixing length increases. In addition, the 80 μm micromixer performs better than the 200 μm one at each mixing length. The error bars also indicate that the uniformity of the mixing results improve with the increasing mixing length and decreasing pore size.

Figure 10A:
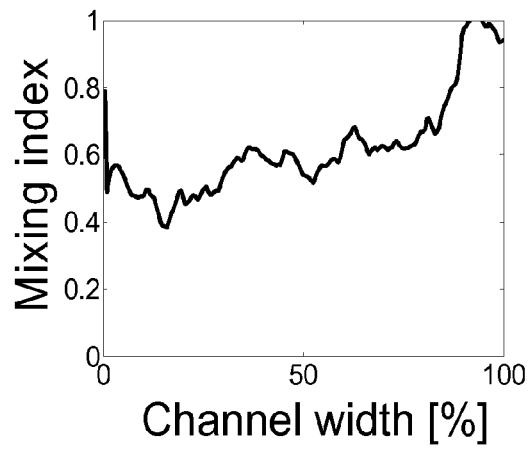
FIG. 10A is a graph of a mixing index curve for Re=0.1, pore diameter size 80 μm and 2 millimeters mixing length.
Figure 10B:
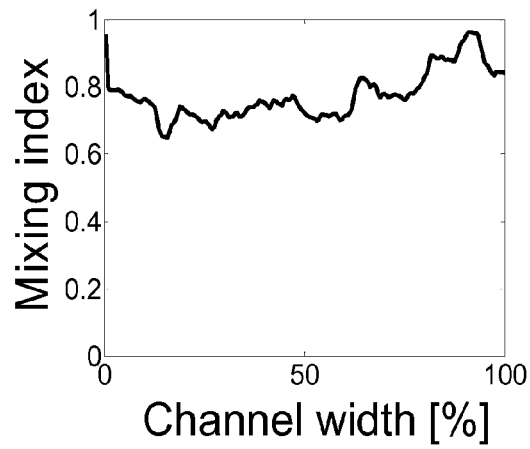
FIG. 10B is a graph of a mixing index curve for Re=0.1, pore diameter size 80 μm and 4 millimeters mixing length.
Figure 10C:
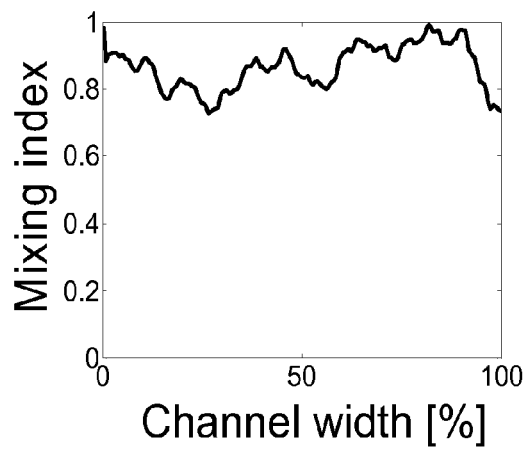
FIG. 10C is a graph of a mixing index curve for Re=0.1, pore diameter size 80 μm and 6 millimeters mixing length.
Figure 10D:
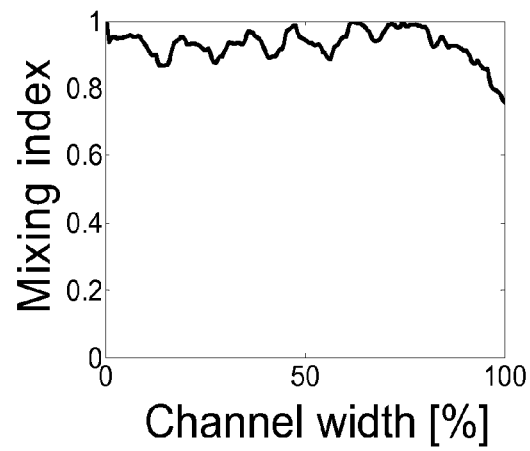
FIG. 10D is a graph of a mixing index curve for Re=0.1, pore diameter size 80 μm and 8 millimeters mixing length.

FIG. 10 shows the mixing results when the pore size was 80 μm and the Reynolds number was 0.1 (flow rate 0.0021 ml/min) for 2 mm mixing length (FIG. 10A), 4 mm mixing length (FIG. 10B), 6 mm mixing length (FIG. 10C) and 8 mm mixing length (FIG. 10D). The mixing index curves suggest good mixing results after a 2 mm mixing length. The results shown in FIG. 10 suggest that small pore size porous micromixers can be effective for mixing flows with very low Reynolds numbers. The reason for the effectiveness of smaller pores is twofold. First, smaller pores help to shorten the diffusion length in the mixing structure, resulting in quicker mixing. Second, the size of the pores is inversely proportional to the number of pores in the foamed region. A large number of pores provides more chance for splitting, stretching, and folding the flows, which in turn increase the mixing efficiency of the micromixer. Additionally, the micromixer has a random porous structure wherein the locations of the pore openings are randomly distributed. This will result in flow trajectories in different directions when the fluid passes through the porous structure. It is possible that chaotic advection, a very effective way of mixing, could occur in this situation. In that case, a higher Reynolds number, which corresponds to a faster flow velocity, could trigger a higher level of chaotic advection and result in a better mixing result.

Pressure Drop Across the Porous Region

The pressure drop across the mixing region of the micromixer determines the amount of energy required to drive the flows and affects the applicability of the micromixer in certain applications. For example, in mixing involving live biological cells, a high pressure drop may cause shear forces that could affect the cell survivability. The pressure drop of the micromixer with an average pore size of 80 μm was measured. The pressure drop in the tubing and feed channel was also measured and determined to be negligible compared to that across the porous region. The data was used to analyze the relation among the pressure drop, pore size, and flow rate based on a well-known theory for flows through porous media, the Ergun equation.

The Ergun equation describes an empirical relationship between the volumetric flow rate and the pressure differential across a porous medium, $$\frac{\Delta P}{L} = 150 \frac{(1-\gamma)^2}{\gamma^3} \frac{\kappa U}{D_p^2} \qquad (5)$$

where $\Delta P$ is the pressure difference, L is the length of the porous region, $\gamma$ is the effective porosity, $\kappa$ is the viscosity of flow, U is the flow velocity, and $D_p$ is the characteristic pore diameter.

Equation (5) can be used to estimate the effective porosity based on experimental data. For example, the effective porosity $\gamma$ of the 80 μm pore sized micromixer was estimated to be $\gamma=0.76$ based on the flow conditions and the pressure drop measurements. Given the effective porosity, the pressure drop can be predicted as a function of flow rate and average pore size.

Figure 11A:
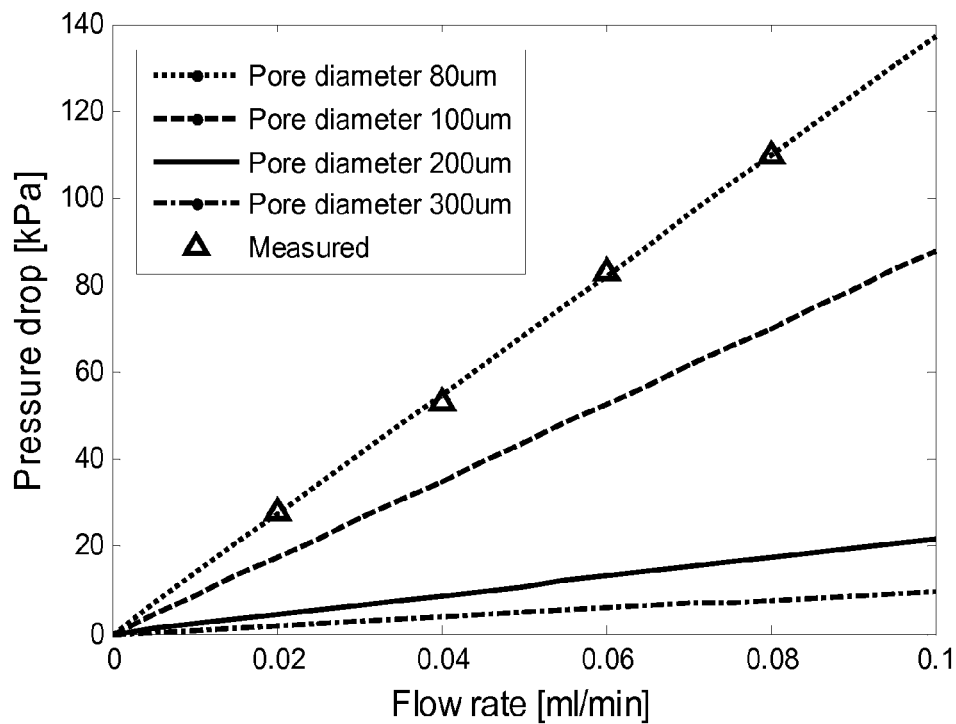
FIG. 11A is graph plotting predicted and measured pressure drop in kPa versus flow rate in ml/min for various pore diameter sizes at an effective porosity of 0.76 and mixing length of 2 mm.

FIG. 11A shows the predicted pressure drops across the porous region with different pore sizes as a function of the flow rate. The effective porosity $\gamma$ is 0.76. The mixing length is 2 mm. The pressure drop increases almost linearly with the flow rate. Small pore diameters result in large pressure drops. According to the Ergun equation, the pressure drop is inversely proportional to the square of the pore diameter. Therefore, a small pore size, although advantageous for improving the mixing performance, is disadvantageous in terms of the pressure drop.

Figure 11B:
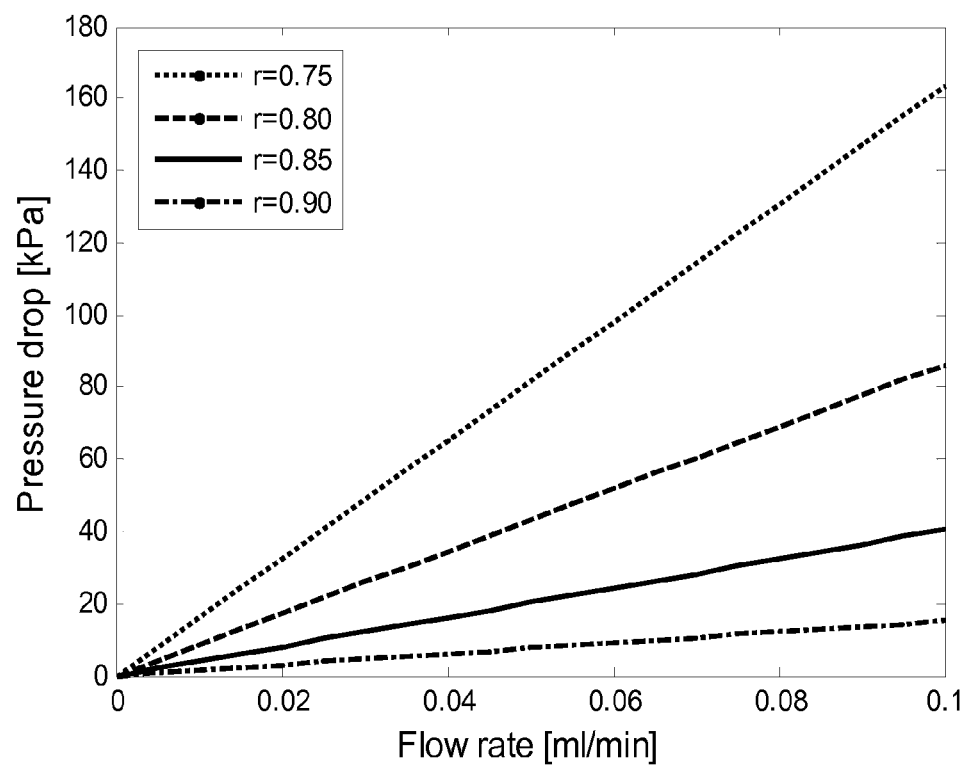
FIG. 11B is a graph plotting predicted pressure drop in kPa versus flow rate at various effective porosities for a pore diameter size of 80 μm and mixing length of 2 mm.

To reduce the pressure drop for small pore sized micromixers, the effective porosity may be increased. As can be seen in Eq. (5), the pressure drop approaches zero when the effective porosity $\gamma$ approaches one, i.e., $\Delta P \rightarrow 0$, if $\gamma \rightarrow 1$. FIG. 11B shows the effect of porosity on the pressure drop when the pore diameter is 80 μm and the mixing length is 2 mm. It can be seen that a slight increase in the effective porosity will result in a huge decrease in the pressure drop. Therefore, if a lower pressure drop is required, a porous micromixer with higher porosity can be used.

While illustrative embodiments have been illustrated and described, it will be appreciated that various changes can be made therein without departing from the spirit and scope of the invention.

The embodiments of the invention in which an exclusive property or privilege is claimed are defined as follows:

1. A micromixer disposed in a polymeric chip, comprising:
    a polymeric chip having a localized porous region, wherein the porous region is surrounded by a non-porous region of the polymeric chip;
    a first microfluidic inlet channel to the porous region;
    a second microfluidic inlet channel to the porous region at about the same location of the porous region as the first inlet; and
    a microfluidic outlet channel from the porous region that is distal to the first and second inlets such that fluids from the first and second inlets are mixed in the porous region before exiting as a mixed fluid through the outlet channel,
    wherein the porous region and the non-porous region are formed from the polymeric chip and are monolithic with the polymeric chip.

2. The micromixer of claim 1, wherein the porous region comprises pores having an average diameter size of 10 μm to 200 μm.

3. The micromixer of claim 1, wherein the porous region comprises pores having an average diameter size of 80 μm to 200 μm.

4. The micromixer of claim 1, wherein the polymeric chip is a thin material, the porous region is internally located in the thin material, and the first and second inlets and the outlet comprise channels leading to or into the porous region, wherein the outlet is positioned at a distal location in relation to the first and second inlets.

5. The micromixer of claim 1, comprising more than one outlet, wherein each outlet is distally located from the first and the second inlets at a different length along the porous region.

6. The micromixer of claim 1, comprising more than two inlets, wherein the outlet remains distal to each inlet.

7. The micromixer of claim 1, wherein the micromixer is a passive mixer.

8. A micromixer disposed in a polymeric substrate, comprising:
    a polymeric substrate having a localized region of porous foam formed from the polymeric substrate material and internally located in the polymeric substrate material, wherein the porous foam defines a length with a proximal end and a distal end, and wherein the porous foam is surrounded by a non-porous region of the polymeric substrate;
    a first microfluidic channel leading to the porous foam at or about the proximal end; and
    a second microfluidic channel leading out from the porous foam at or about the distal end, such that one or more fluids entering the porous foam from the first microfluidic channel are mixed in the porous foam before exiting from the second microfluidic channel.

9. The micromixer of claim 8, wherein the porous foam comprises pores having an average diameter size of 10 μm to 200 μm.

10. The micromixer of claim 8, wherein the porous foam comprises pores having an average diameter size of 80 μm to 200 μm.

11. The micromixer of claim 8, wherein the polymeric substrate is a thin material, the porous foam is internally located in the thin material, and the inlet and the outlet comprise channels leading to or into the porous foam, wherein the outlet is positioned at a distal location in relation to the first inlet.

12. The micromixer of claim 8, comprising more than one outlet, wherein the outlet remains distal to each inlet.

13. The micromixer of claim 8, wherein the micromixer is a passive mixer.

14. A method for mixing a first and second fluid in the micromixer of claim 1, comprising:
    supplying a first and second fluid to the micromixer;
    mixing the first and second fluids within the porous region of the micromixer; and
    obtaining a mixed fluid from an outlet of the micromixer, wherein the Reynolds number of the fluid in the micromixer is 0.1 to 10.

15. The method of claim 14, wherein the porous region comprises pores having an average diameter size of 10 μm to 200 μm.

16. The method of claim 14, wherein the porous region comprises pores having an average diameter size of 80 μm to 200 μm.

17. The method of claim 14, wherein one or both fluids comprise living cells.

18. The method of claim 14, wherein the first fluid comprises first living cells and the second fluid comprises second living cells.

19. A method for mixing a first and second fluid in the micromixer of claim 1, comprising:
supplying a first and second fluid to the micromixer;
mixing the first and second fluids within a porous region of the micromixer; and
obtaining a mixed fluid from an outlet of the micromixer, wherein the porous region comprises pores having an average diameter size of 10 μm to 200 μm.

20. The method of claim 19, wherein the porous region comprises pores having an average diameter size of 80 μm to 200 μm.

21. The method of claim 19, wherein one or both fluids comprise living cells.

22. The method of claim 19, wherein the first fluid comprises first living cells and the second fluid comprises second living cells.

23. The micromixer of claim 1, wherein the polymeric chip has more than one localized porous region within the polymeric chip, and wherein the porous regions are separate and distinct from each other.

24. The micromixer of claim 1, wherein the first microfluidic inlet channel, the second microfluidic inlet channel, and the microfluidic outlet channel are formed from the polymeric chip and are monolithic with the polymeric chip.

* * * * *